3,269,838
METHOD OF MAKING LUMINESCENT SCREENS FOR CATHODE RAY TUBES
Theodore A. Saulnier, Lancaster, Pa., assignor to Radio Corporation of America, a corporation of Delaware
No Drawing. Filed Mar. 18, 1963, Ser. No. 266,020
16 Claims. (Cl. 96—36.1)

This invention relates to a method of making luminescent screens for cathode ray tubes. The invention is particularly directed to the so-called slurry-direct photographic process for making mosaic-type screens having a systematically arrayed multiplicity of elemental phosphor areas such as dots or stripes. Such screens having three systematic dot arrays, each of a different color emitting phosphor may be used in apertured shadow mask type cathode ray tubes.

In making phosphor screens by this process, one prior method uses a slurry which comprises phosphor particles, a polymeric binder such as polyvinyl alcohol (PVA), a photosensitizer such as ammonium dichromate, and a suspension medium such as water. A quantity of the slurry is deposited near the center of a cathode ray tube faceplate panel and is spread evenly thereover by spinning and tilting the panel according to a selected schedule. After the slurry has been spread over the faceplate panel to provide a layer of desired thickness, it is dried. The phosphor coating on the faceplate panel is then exposed to a desired pattern, e.g., dots or stripes, of actinic rays through a suitable apertured mask negative, which may eventually be incorporated as a part of the finished cathode ray tube. The exposed layer is then developed by washing it to remove the unexposed phosphor areas, thus leaving the desired array of elemental phosphor areas adhered to the panel. The process is repeated for each of a plurality of desired phosphors, such as red-emitting, green-emitting, and blue-emitting, to produce the finished screen.

In making screens by the slurry-direct photographic process, consideration in formulating the slurry must be given not only to formulation of structurally strong and well defined phosphor deposit, to adherence of the phosphor to the substrate, and to good light output in the finished product, but also be making the slurry compatible (e.g., as to its viscosity) with mechanized screening techniques as described above. These considerations are often conflicting; and as a result compromises have been resorted to by the prior art.

It is an object of this invention to provide an improved slurry formulation for making mosaic-type phosphor screens by the slurry-direct photographic process.

It is also an object of this invention to provide a phosphor slurry formulation which both results in one or more of improved phosphor adherence, improved phosphor deposit structure, improved light output from the finished screen, and improved compatibility with mechanized screening techniques.

In the prior art, phosphor slurry formulations have included for each 100 weight parts phosphor, about 19–24 weight parts of a polyvinyl alcohol which is polymerized to have a molecular weight of 120,000–135,000 and which at a 4% aqueous solution has a viscosity of about 21–25 centipoises.

In accordance with one feature of my invention, a phosphor slurry includes lower percentages of polyvinyl alcohol than used by the prior art and a polyvinyl alcohol which is more highly polymerized than that used by the prior art. For example, the slurry may include for each 100 weight parts phosphor, about 9–17 weight parts of a polyvinyl alcohol which is polymerized to have a molecular weight of 170,000–220,000, which is 87–89% hydrolyzed, and which at a 4% aqueous solution has a viscosity of about 35–45 centipoises. Such slurries are hereinafter referred to as low polyvinyl alcohol slurries as distinguished from high polyvinyl alcohol slurries of the prior art. Such low polyvinyl alcohol slurries produce low polyvinyl alcohol screens. The polyvinyl alcohol used, in such slurries is hereinafter referred to as a highly polymerized type to distinguish it from the less polymerized type used by the prior art.

In accordance with another feature of my invention, a small amount of a substantially nondichromatizable resin, or resin substitute, is included in the phosphor slurry.

Each of the above-described features may be used separately in the absence of the other. However, the advantages of my invention are greater when the two features are employed in combination than would be expected from the improvement derived by the use of each feature above. Inclusion of the resins in the slurry produces greater increase of light output in low polyvinyl alcohol slurries than in conventional high polyvinyl alcohol prior art slurries. Furthermore, in addition to other advantages hereinbefore noted, the use of resins in low polyvinyl alcohol slurries also serves to simplify the application of acrylic films thereto for the purpose of providing a substrate for metalizing (aluminizing) the screen. Without the addition of resins in low polyvinyl alcohol slurries, a more complex two coat filming process may be required.

A highly polymerized polyvinyl alcohol suitable for use in the practice of this invention is commercially obtainable from E. I. du Pont de Nemours Co. as Elvanol type 50–42. Suitable slurries can be made with such a polyvinyl alcohol in which the weight ration of polyvinyl alcohol/phosphor is within the range of 0.09–0.17 and in which the viscosity of the phosphor slurries are in the range of 25–70 centipoises. The limits of these ranges are not critical. Inasmuch as the particle size distribution of the phosphor also affects the viscosity of the slurry, the ratio of polyvinyl alcohol/phosphor and the concentration of the polyvinyl alcohol and phosphor are necessarily variable so as to obtain a desired slurry viscosity. In slurries including phosphor particles of conventional size range, e.g., 0.1 to 20.0 microns, the ratio of polyvinyl alcohol/phosphor required in order to produce the desired viscosity has been found to also provide binder quantities suitable for proper photo polymerization in a slurry-direct photographic screening process.

The amount of photosensitizer used depends upon the particular photoexposing system employed. Parameters such as design of the apertured mask negative, the type of light source, the exposure time, the size of the phosphor areas desired, and the thickness of the applied coating determine the amount of the photosensitizer. Suitable mosaic dot screens have been made using weight ratios of ammonium dichromate/polyvinyl alcohol of up to 0.25. Other suitable photosensitizers are known to the art and include potassium dichromate and sodium dichromate.

Suitable resins for inclusion in the slurry should, first of all, not readily absorb the dichromate photosensitizer in the slurry, i.e. be nondichromatizable. When such absorption occurs, not only is the sensitization of the polyvinyl alcohol weakened, but the absorbing medium becomes discolored and presents a degree of opacity to the actinic rays subsequently used to harden the phosphor areas of the screen. As a result, the thickness of a dried phosphor slurry layer which can be hardened by exposure is limited to less than that which can be usefully excited by an electron beam. The resin should also be: (a) dispersible in water; (b) of relatively small particles or globules, e.g. 0.1–2.0 micron in size; (c) be vaporizable and thus heat-removable at conventional bake-out temperatures of e.g. 400–450° C.; and (d) preferably nonionic so as to be more easily incorporated with the dichromate-sensitized polyvinyl alcohol.

The inclusion of the resin in the phosphor slurry serves to take up the space of the interstices between the phosphor particles and thus the resin helps to bond the particles together. Yet, because the resin does not absorb the dichromate and become discolored, it does not degrade the UV transmissivity of the dried phosphor slurry layer as much as would the dichromatized polyvinyl chloride required to do the same job. The filling in of the interstices by the resin also facilitates the filming (for aluminizing) of the phosphor layer when acrylic emulsions are used for that purpose. Without the resin filler between the phosphor particles, when an acrylic filming emulsion is applied to the phosphor layer, the film formed from the acrylic may not bridge the interstices between the phosphor particles. If sufficient bridging does not occur, the acrylic film and the metal layer applied thereupon will tend to occlude the surface phosphor particles and trap the emitted light thereof. Furthermore, it appears that the fine emulsion resin solids in the slurry also act as a lubricant between the relatively coarse and irregularly shaped phosphor crystals. Thus they improve the slurry coating action, i.e. the flow characteristics of the slurry during application thereof to a substrate.

Suitable resin materials which may be added to the slurry include, for example: polyvinyl acetate, and acrylic resins such as alkyl acrylate, alkyl methacrylate and copolymers thereof. Commercially available polyvinyl acetate resins which have proved satisfactory include Elvacet 84–1100 sold by E. I. du Pont de Nemours Co. and Darex Everflex A, B, MA, or MF sold by Dewey & Almy Co. Of the acrylic resins ethyl acrylate, ethyl methacrylate, methyl acrylate, methyl methacrylate and copolymers thereof are preferred. Some preferred acrylic resins are commercially available from Rohm & Haas under the trade designation of Rhoplex and identified as B85, B74, C72, D70 and B15.

Nondichromatizable nonresinous materials such as colloidal silica and colloidal alumina may be used as substitutes for the nondichromatizable resin to obtain added strength of the phosphor deposit. However, materials such as silica and alumina have the objection of not being heat removable from the screen during bake-out. When such materials are used, excessive amounts of nonluminescent residue is therefore left in the finished screen.

The amount of resin or resin substitute used is best determined by relating it to the amount of polyvinyl alcohol contained in the phosphor slurry. Nevertheless, the amount of resin used is not independent of the amount and particle size of the phosphor. For slurries with higher polyvinyl alcohol/phosphor ratios, lower resin/polyvinyl alcohol ratios are usually preferred. Conversely, for slurries with lower polyvinyl alcohol/phosphor ratios, higher resin/polyvinyl alcohol ratios can be advantageously used and are thus usually preferred. For a polyvinyl alcohol/phosphor weight ratio range of 0.09–0.24 a resin/polyvinyl alcohol weight ratio of 0.25–2.0 is satisfactory. The limits of this resin/polyvinyl alcohol ratio range are not critical. Use of more resin than about twice the polyvinyl alcohol may adversely affect rewet adherence of the phosphor layer to the faceplate panel and make washoff of undeveloped areas difficult. However, resin/polyvinyl alcohol ratios as high as about 3.0 have been successfully used.

In the case of a preferred acrylic resin material, viz. one consisting primarily of ethyl acrylate (for example, Rhoplex C72), resin/polyvinyl alcohol weight ratios of 0.25–2.0 have been used in slurries having polyvinyl alcohol/phosphor weight ratios of 0.13–0.16 and a phosphor particle and/or aggregate size distribution of about ¼ less than 5 microns, about ½ in the 5–10 micron size range, and about ¼ greater than 10 microns. In such slurries a weight ratio of ethyl acrylate/polyvinyl alcohol of about 1.0 has given the best results. In prior art high polyvinyl alcohol slurries having a polyvinyl alcohol/phosphor ratio of 0.22 with the same ¼–½–¼ particle size distribution, an ethyl acrylate/polyvinyl alcohol weight ratio of 0.25–1.5 has been successfully used. Polyvinyl acetate resin has been successfully added to slurries wherein the polyvinyl alcohol/phosphor ratio was as high as 0.398 and the resin/polyvinyl alcohol ratio was as high as 2.9.

Examples of specific phosphor slurry formulations which have been successfully used in manufacture of mosiac dot screens for shadow mask-type color cathode ray tubes are as follows:

Example #1

150 grams of red-emitting, silver-activated zinc-cadmium sulfide in which the ratio by weight of zinc sulfide to cadmium sulfide is about 0.21 and which contains about 0.002% by weight of silver activator, and which has a particle size distribution in the range of 0.1 to 20 microns.

160 grams 10% aqueous solution by weight of highly polymerized polyvinyl alcohol having a molecular weight of 170,000–220,000 and which at a 4% aqueous solution has a viscosity of 35–45 centipoises.

230 grams water.

20 grams 10% aqueous solution by weight ammonium dichromate.

In the specific formulation of Example #1, the weight ratio of polyvinyl alcohol/phosphor is 0.107. Suitable variations of the slurry of Example #1 can be made using from 135 to 225 grams of 10% polyvinyl alcohol solution to give a weight ratio of polyvinyl alcohol/phosphor of from 0.09–0.15. In determining the precise ratio of polyvinyl alcohol/phosphor to be used, the viscosity of the formulation is made to be within the range of 25 to 35 centipoises.

Example #2

125 grams of blue-emitting, silver-activated, zinc sulfide phosphor containing from about 0.003 to about 0.020% by weight of silver activator, and which has a particle size distribution in the range of about 0.1 to 20 microns.

180 grams 10% aqueous solution by weight of highly polymerized polyvinyl alcohol having a molecular weight of 170,000–220,000 and which at a 4% aqueous solution has a viscosity of 35–45 centipoises.

208 grams water.

24 grams 10 aqueous solution by weight ammonium dichromate.

In the specific formulation of Example #2, the weight ratio of polyvinyl alcohol/phosphor is 0.144. Suitable variations of the slurry of Example #2 can be made using from 112 to 205 grams of 10% polyvinyl alcohol solution to give a weight ratio of polyvinyl alcohol to phosphor of from 0.09–0.164. In determining the precise ratio of polyvinyl alcohol to phosphor to be used, the viscosity of the formulation is made to be within the range of 28 to 38 centipoises, preferably at about 32 centipoises.

Example #3

125 grams green-emitting, silver-activated, zinc-cadmium sulfide in which the ratio by weight of zinc sulfide to cadmium sulfide is about 1.9 and which contains about .003% by weight of silver activator, and in which the particle size distribution is in the range of 0.1 to 20 microns.

120 grams 10% aqueous solution by weight highly polymerized polyvinyl alcohol which has a molecular weight of 170,000–220,000 and which at a 4% aqueous solution has a viscosity of 35–45 centipoises.

268 grams water.

24 grams 10% aqueous solution by weight ammonium dichromate.

In the specific formulation of Example #3, the weight ratio of polyvinyl alcohol/phosphor is 0.096. Suitable variations of the slurry of Example #3 can be made using from 112 to 188 grams of 10% polyvinyl alcohol solution to give a weight ratio of polyvinyl alcohol/phosphor of from 0.09–0.15. In determining the precise ratio of polyvinyl alcohol/phosphor to be used, the viscosity of the formulation is made to be within the range of 20–35 centipoises, preferably at about 30 centipoises.

Example #4

21.00 weight percent red-emitting phosphor of the type used in Example #1.
3.36 weight percent of low polymerized polyvinyl alcohol having a molecular weight of 120,000–135,000 and which at a 4% aqueous solution has a viscosity of 21–25 cps.
3.36 weight percent of Rhoplex C72 solids, an acrylic resin comprising principally ethyl acrylate.
0.504 weight percent ammonium dichromate.
1.18 weight percent ethylene glycol.
70.596 weight percent water.

This slurry formulation has polyvinyl alcohol/phosphor weight ratio of 0.16, a resin/polyvinyl alcohol weight ratio of 1.0, and a viscosity of 40–45 cps.

Example #5

21.00 weight percent blue-emitting phosphor of the type used in Example #2.
3.02 weight percent of highly polymerized polyvinyl alcohol having a molecular weight of 170,000–220,000 and which at a 4% aqueous solution has a viscosity of 35–45 cps.
3.02 weight percent Rhoplex C72 solids, an acrylic resin comprising principally ethyl acrylate.
0.45 weight percent ammonium dichromate.
72.51 weight percent water.

This slurry formulation has a polyvinyl alcohol/phosphor weight ratio of 0.144, a resin/polyvinyl alcohol weight ratio of 1.0, and a viscosity of 35–50 cps.

Example #6

20.00 weight percent green-emitting phosphor of the type used in Examples #3.
2.63 weight percent of highly polymerized polyvinyl alcohol having a molecular weight of 170,000–220,000 and which at a 4% aqueous solution has a viscosity of 35–45 cps.
2.63 weight percent of Rhoplex C72 solids, an acrylic resin comprising principally ethyl acrylate.
0.39 weight percent ammonium dichromate.
74.35 weight percent water.

This slurry formulation has a polyvinyl alcohol/phosphor weight ratio of 0.132, a resin/polyvinyl alcohol weight ratio of 1.0, and a viscosity of 35–50 cps.

Example #7

12.145 weight percent red-emitting, manganese activated zinc ortho-phosphate phosphor which contains about 8.8 mole percent of manganese activator.
4.31 weight percent low polymerized polyvinyl alcohol having a molecular weight of 120,000–135,000 and which at a 4% aqueous solution has a viscosity of 21–25 cps.
10.75 weight percent Elvacet 84–1100, a polyvinyl acetate resin containing a small percentage of polyvinyl alcohol as a protective colloid.
0.22 weight percent ammonium dichromate.
72.575 weight percent water.

This slurry formulation has a polyvinyl alcohol/phosphor weight ratio of 0.36 and a resin/polyvinyl alcohol weight ratio of 2.5.

Example #8

9.26 weight percent of green-emitting, manganese activated zinc ortho-silicate-phosphor which contains about 1.2 mole percent of manganese activator.
3.68 weight percent of low polymerized polyvinyl alcohol having a molecular weight of 120,000–135,000 and which at a 4% aqueous solution has a viscosity of 21–25 cps.
10.75 weight percent of Elvacet 84–1100, a polyvinyl acetate resin containing a small percentage of polyvinyl alcohol as a protective colloid.
0.18 weight percent ammonium dichromate.
76.13 weight percent water.

This slurry formulation has a polyvinyl alcohol/phosphor weight ratio of 0.36; a resin/polyvinyl alcohol weight ratio of 2.83.

Example #9

10.65 weight percent blue-emitting phosphor of type used in Example #2.
3.80 weight percent low polymerized polyvinyl alcohol having a molecular weight of 120,000–135,000 and which at a 4% aqueous solution has a viscosity of 21–25 cps.
10.75 weight percent Elvacet 84–1100, a polyvinyl acetate resin containing a small percentage of polyvinyl alcohol as a protective colloid.
0.16 weight percent ammonium dichromate.
74.64 weight percent water.

This slurry formulation has a polyvinyl alcohol/phosphor weight ratio of 0.36 and a resin/polyvinyl alcohol weight ratio of 2.83.

The slurry of Example #4 is one which is especially designed for application to a substrate which already has a pattern of spaced elemental deposits of a different phosphor thereon. The slurry of Example #4 is characterized by a formulation which includes a non-dichromatizable resin in combination with a low concentration of a low polymerized polyvinyl alcohol. In this particular combination the low polyvinyl alcohol concentration (polyvinyl alcohol/phosphor ratio of 0.16) contributes to improved light output. The presence of the acrylic resin contributes to good bonding between phosphor particles and well defined boundaries of the elemental deposits. The use of a low polymerized polyvinyl alcohol (which also means a low viscosity polyvinyl alcohol) results in good removal (washoff) of unexposed areas during the development step. The satisfactory use of a low viscosity polyvinyl alcohol in low concentration is made possible by the inclusion of the resin which tends to increase the viscosity of the slurry to a suitable level. Because of the better washoff obtained by the use of a low viscosity polyvinyl alcohol, the likelihood of cross-contamination of the different phosphors of the plural phosphor screen is reduced.

Although this invention is not limited to any particular processing procedure in preparing (mixing) the slurry, the general order of the steps set forth below have been found to produce satisfactory results. For example red-emitting phosphor slurries such as the slurry of Example #1 have been prepared as follows:

Mill 150 gm. phosphor, 160–240 gm. 10% polyvinyl alcohol solution, and 230 gm. water for ½ hour in a one quart ball mill with a 1262 gm. charge of #A1 flint pebbles (Abbe Engineering). Empty the mill charge into a pot and stir until the foam is nearly settled. Add any additional required polyvinyl alcohol if the entire called-for amount was not included in the initial mill charge. Stir in the resin emulsion called for by the formula in question. Sensitize the slurry with the required amount of ammonium dichromate or other sensitizer. Keep the slurry under continuous agitation before and during use to maintain as nearly as possible a uniform suspension.

What is claimed is:

1. In the method of making a phosphor screen by the slurry-direct photographic process, the step of coating a substrate with a slurry comprising phosphor, polyvinyl alcohol, and water in which the weight ratio of polyvinyl alcohol/phosphor is from 0.09 to 0.17, and the polyvinyl alcohol is of the highly polymerized type having a molecular weight of about 170,000 to 220,000.

2. In the method of making a phosphor screen by the slurry-direct photographic process, the steps of:
   (a) preparing a slurry including phosphor, polyvinyl alcohol, and water in which the viscosity of the slurry is 25–45 centipoises, the weight ratio of polyvinyl alcohol/phosphor is 0.09–0.17, and the polyvinyl alcohol has a molecular weight of 170,000–220,000 and is so polymerized that a 4% aqueous solution thereof has a viscosity of 35–45 centipoises, and
   (b) applying a layer of said slurry to a substrate.

3. The method of laying down a mosaic pattern of elemental phosphor areas on a faceplate panel comprising the steps of:
   (a) depositing on said faceplate panel a layer comprising phosphor, polyvinyl alcohol, a photosensitizer, and water in which the weight ratio of polyvinyl alcohol/phosphor is 0.09–0.17 and the polyvinyl alcohol has a molecular weight of about 170,000–220,000,
   (b) drying said layer,
   (c) exposing said dried layer to a desired pattern of actinic rays, and
   (d) developing the exposed layer to remove the unexposed portions thereof.

4. In the method of making a phosphor screen by the slurry-direct photographic process, the steps of:
   (a) preparing a slurry comprising phosphor, polyvinyl alcohol, nondichromatizable resin, and water, said nondichromatizable resin consisting essentially at least one of polyvinyl acetate, alkyl acrylate, and alkyl methacrylate, and the weight ratio of resin/polyvinyl alcohol is between 0.25 and 3.0, and
   (b) applying a layer of said slurry to a substrate.

5. In the method of making a phosphor screen by the slurry-direct photographic process, the step of coating a substrate with a slurry including phosphor, polyvinyl alcohol, nondichromatizable acrylate or methacrylate resin, and water in which slurry the weight ratio of resin/polyvinyl alcohol is 0.25–2.0.

6. The method of laying down a mosaic pattern of elemental phosphor areas on a faceplate panel comprising the steps of:
   (a) depositing on said faceplate panel a layer comprising phosphor, polyvinyl alcohol, photosensitizer, water, and a nondichromatizable acrylic resin selected from the group consisting of ethyl acrylate, ethyl methacrylate, methyl acrylate, methyl methacrylate, and copolymers thereof, and wherein the weight ratio of resin/polyvinyl alcohol is between 0.25 and 3.0,
   (b) drying said layer,
   (c) exposing said dried layer to a desired pattern of actinic rays, and
   (d) thereafter developing the said layer to remove the unexposed portions thereof.

7. The method of laying down a mosiac pattern of elemental phosphor areas on a faceplate panel comprising the steps of:
   (a) depositing on said faceplate panel a layer comprising phosphor, polyvinyl alcohol, photosensitizer, nondichromatizable resin, and water, in which the slurry weight ratio of polyvinyl alcohol/phosphor is 0.09–0.17 and the polyvinyl alcohol has a molecular weight of 170,000–220,000, said nondichromatizable resin consisting essentially of at least one of polyvinyl acetate, alkyl acrylate and alkyl methacrylate, and wherein the weight ratio of resin/polyvinyl alcohol is up to 3.0,
   (b) drying said layer,
   (c) exposing said dried layer to a desired pattern of actinic rays, and
   (d) thereafter developing the said layer to remove the unexposed portions thereof.

8. The method of laying down a mosaic pattern of elemental phosphor areas on a faceplate panel comprising the steps of:
   (a) depositing on said faceplate panel a layer comprising phosphor, polyvinyl alcohol, photosensitizer, nondichromatizable resin, and water in which the ratio of polyvinyl alcohol/phosphor is about 0.09–0.17 and the polyvinyl alcohol has a molecular weight of about 120,000–135,000, said nondichromatizable resin consisting essentially of at least one of polyvinyl acetate, alkyl acrylate and alkyl methacrylate, and wherein the weight ratio of nondichromatizable resin/polyvinyl alcohol is between 0.25 and 3.0,
   (b) drying said layer,
   (c) exposing said dried layer to a desired pattern of actinic rays, and
   (d) developing the exposed layer to remove the unexposed portions thereof.

9. The method of making a phosphor screen by the slurry-direct photographic process wherein the slurry thereof comprises phosphor, polyvinyl alcohol, water, and a nondichromatizable acrylic resin selected from the group consisting of alkyl acrylate, alkyl methacrylate, and copolymers thereof, and wherein the weight ratio of resin/polyvinyl alcohol is 0.25–2.0, the ratio of polyvinyl alcohol to phosphor is 0.09–0.17, and the polyvinyl alcohol has a molecular weight of 170,000–220,000 and is so polymerized that a 4% aqueous solution thereof has a viscosity of 35–45 centipoises.

10. The method of making a phosphor screen by the slurry-direct photographic process wherein the slurry thereof comprises phosphor, polyvinyl alcohol, water, and a nondichromatizable resin selected from the group consisting of alkyl acrylates, alkyl methacrylates, and polyvinyl acetate, and wherein the weight ratio of nondichromatizable resin/polyvinyl alcohol is about 0.25 to 3.0 and the weight ratio of polyvinyl alcohol/phosphor is about 0.09–0.17, and the polyvinyl alcohol has a molecular weight of about 120,000–135,000 and is so polymerized that a 4% aqueous solution thereof has a viscosity of 21–25 centipoises.

11. The method of laying down a mosaic pattern of elemental phosphor areas on a faceplate panel comprising the steps of:
   (a) depositing on said faceplate panel a layer comprising phosphor, polyvinyl alcohol, photosensitizer, water, and a nondichromatizable resin which consists essentially of ethyl acrylate, wherein the weight ratio of resin/polyvinyl alcohol is 0.25–2.0, the weight ratio of polyvinyl alcohol/phosphor is 0.09–0.17 and the polyvinyl alcohol has a molecular weight of 170,000–220,000,
   (b) drying said layer,
   (c) exposing said dried layer to a desired pattern of actinic rays, and
   (d) thereafter developing the said layer to remove the unexposed portions thereof.

12. In the method of making a phosphor screen by the slurry-direct photographic process, the step of coating a substrate with a slurry including phosphor, polyvinyl alcohol, water, and a nondichromatizable resin in which the weight ratio of polyvinyl alcohol/phosphor is greater than 0.17 and the polyvinyl alcohol has a molecular weight of 120,000–135,000, said nondichromatizable resin consisting essentially of at least one of polyvinyl acetate, alkyl acrylate, alkyl methacrylate, and the weight ratio of nondichromatizable resin/polyvinyl alcohol is about 0.25 to 3.0.

13. In the method of making a phosphor screen by the slurry-direct photographic process, the step of coating a substrate with a slurry including phosphor, polyvinyl alcohol, water and a nondichromatizable acrylic resin selected from the group consisting of ethyl acrylate, ethyl methacrylate, methyl acrylate, methyl methacrylate, and copolymers thereof in which the ratio of resin/polyvinyl alcohol is about 0.25–1.5, the ratio of polyvinyl alcohol/phosphor is about 0.19–0.24 and the polyvinyl alcohol has a molecular weight of about 120,000–135,000.

14. The method according to claim 8 wherein said phosphor comprises red-emitting, silver-activated, zinc-cadmium-sulfide which has a ratio by weight of zinc sulfide to cadmium sulfide of about 0.21, which contains about 0.002 weight percent of silver activator, and which has a particle size distribution in the range of about 0.01–20 microns, wherein the nondichromatizable resin is principally ethyl acrylate, and wherein the ratio of resin/polyvinyl alcohol is about 1.0 and the ratio of polyvinyl alcohol/phosphor is about 0.16.

15. The method according to claim 11 wherein said phosphor comprises green-emitting, silver-activated, zinc-cadmium-sulfide which has a ratio by weight of zinc sulfide to cadmium sulfide of about 1.9, which contains about 0.002 weight percent of silver activator, and which has a particle size distribution in the range of about 0.01–20 microns; and wherein the ratio of resin/polyvinyl alcohol is about 1.0 and the ratio of polyvinyl alcohol/phosphor is about 0.13.

16. The method according to claim 11 wherein said phosphor comprises blue-emitting, silver-activated, zinc sulfide which contains about 0.005–0.020 weight percent of silver activator and which has a particle size distribution in the range of about 0.1–20 microns, and wherein the ratio of resin/polyvinyl alcohol is about 1.0 and the ratio of polyvinyl alcohol/phosphor is about 0.14.

References Cited by the Examiner
UNITED STATES PATENTS

| | | | |
|---|---|---|---|
| 2,747,997 | 5/1956 | Smith et al. | 96—35 |
| 2,837,429 | 6/1958 | Whiting | 96—35 |
| 2,897,089 | 7/1959 | Ahlburg et al. | 96—35 |
| 2,914,404 | 11/1959 | Fanselau et al. | 96—35 |
| 2,959,483 | 11/1960 | Kaplan | 96—35 |
| 3,067,055 | 12/1963 | Saulnier | 117—33.5 |
| 3,095,317 | 6/1963 | Saffire | 96—35 |
| 3,128,181 | 4/1964 | Doggett | 96—75 X |

FOREIGN PATENTS

| | | |
|---|---|---|
| 222,747 | 7/1959 | Australia. |

OTHER REFERENCES

Goldstein: "RCA Review," June 1959, vol. 20, pp. 336–348.

Jorgensen et al.: The Sensitivity of Bichromated Coatings, 1954, Lithographic Technical Foundation, Inc., New York 16, New York, pp. 143–145.

Levy et al.: "The Sylvania Technologist," July 1953, vol. VI, No. 3, pp. 60–63.

NORMAN G. TORCHIN, *Primary Examiner.*

A. D. RICCI, *Assistant Examiner.*

UNITED STATES PATENT OFFICE
CERTIFICATE OF CORRECTION

Patent No. 3,269,838            August 30, 1966

Theodore A. Saulnier

It is hereby certified that error appears in the above numbered patent requiring correction and that the said Letters Patent should read as corrected below.

Column 1, line 44, for "be" read -- to --; column 3, line 11, for "chloride" read -- alcohol --.

Signed and sealed this 1st day of August 1967.

(SEAL)
Attest:

EDWARD M. FLETCHER, JR.          EDWARD J. BRENNER
Attesting Officer                 Commissioner of Patents